(12) United States Patent
Ooishi

(10) Patent No.: US 9,124,526 B2
(45) Date of Patent: Sep. 1, 2015

(54) SWITCH SYSTEM, AND DATA FORWARDING METHOD

(75) Inventor: Masaaki Ooishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 13/824,275

(22) PCT Filed: Sep. 8, 2011

(86) PCT No.: PCT/JP2011/070432
§ 371 (c)(1),
(2), (4) Date: Mar. 15, 2013

(87) PCT Pub. No.: WO2012/049925
PCT Pub. Date: Apr. 19, 2012

(65) Prior Publication Data
US 2013/0170503 A1 Jul. 4, 2013

(30) Foreign Application Priority Data
Oct. 15, 2010 (JP) ................................. 2010-232597

(51) Int. Cl.
| | | |
|---|---|---|
| H04L 12/721 | (2013.01) | |
| H04L 12/933 | (2013.01) | |
| H04L 12/947 | (2013.01) | |
| H04L 12/715 | (2013.01) | |
| H04L 12/741 | (2013.01) | |

(52) U.S. Cl.
CPC ................ *H04L 45/38* (2013.01); *H04L 45/54* (2013.01); *H04L 45/64* (2013.01); *H04L 49/15* (2013.01); *H04L 49/25* (2013.01)

(58) Field of Classification Search
None
See application file for complete search history.

(56) References Cited

U.S. PATENT DOCUMENTS

| | | |
|---|---|---|
| 2009/0154461 A1 | 6/2009 | Kitani et al. |
| 2009/0316700 A1 | 12/2009 | White et al. |
| 2010/0215047 A1 | 8/2010 | Filsfils et al. |

(Continued)

FOREIGN PATENT DOCUMENTS

| | | |
|---|---|---|
| JP | 2004-221807 A | 8/2004 |
| JP | 2009-147710 A | 7/2009 |
| WO | WO 2010/103909 A1 | 9/2010 |

OTHER PUBLICATIONS

English translation of PCT/ISA/237 (written opinion of the international searching authority, dated Nov. 1, 2011).

(Continued)

*Primary Examiner* — Benjamin H Elliott, IV
(74) *Attorney, Agent, or Firm* — McGinn IP Law Group, PLLC

(57) ABSTRACT

The upper limit of the number of the flow entries subjected to retrieval is increased by making it possible to retrieve the flow entries in plural switches for one communication data. Specifically, the control server registers flow entries by distributing them to the flow table in each switch belonging to a switch group. When acquiring the communication data, each switch checks whether the communication data is matched with any of the flow entries registered in the flow table. When the communication data is matched with a flow entry, the communication data is forwarded based on the forwarding procedure defined in the flow entry. When the communication data is not matched with any flow entry, the communication data is forwarded to "flow table unretrieved switch" belonging to the same switch group. When there is no flow table unretrieved switch, a query of the forwarding procedure is performed to the control server.

10 Claims, 7 Drawing Sheets

(56) References Cited

U.S. PATENT DOCUMENTS

2011/0261825 A1   10/2011   Ichino
2011/0270979 A1*  11/2011   Schlansker et al. ........... 709/224
2011/0317559 A1*  12/2011   Kern et al. ................... 370/235

OTHER PUBLICATIONS

PCT/IB/373 dated May 8, 2013.
European Search Report dated May 9, 2014.
Wissam Hamzeh et al: "A distributed parallel approach for BGP routing table partitioning in next generation routers", Local Computer Networks (LCN), 2010 IEEE 35th Conference on, IEEE, Oct. 10, 2010, pp. 472-479, XP031986815, DOI: 10.1109/LCN.2010.5735761 ISBN: 978-1-4244-8387-7.
International Search Report in PCT/JP2011/070432 dated Nov. 1, 2011 (English Translation Thereof).
"OpenFlow Switch Specification Version 1.0.0 (Wire Protocol 0x01) Dec. 31, 2009" <http://www.openflow.org/documents/openflow-spec-v1.0.0.pdf>.
"A Study on Deployment of Network Appliance Functionalities in Datacenter Network", H. Ueno, et al., NEC Corporation, Nov. 13, 2009, vol. 109, No. 296, pp. 7-12.
Chinese Office Action dated Dec. 18, 2014 with an English Translation thereof.

* cited by examiner

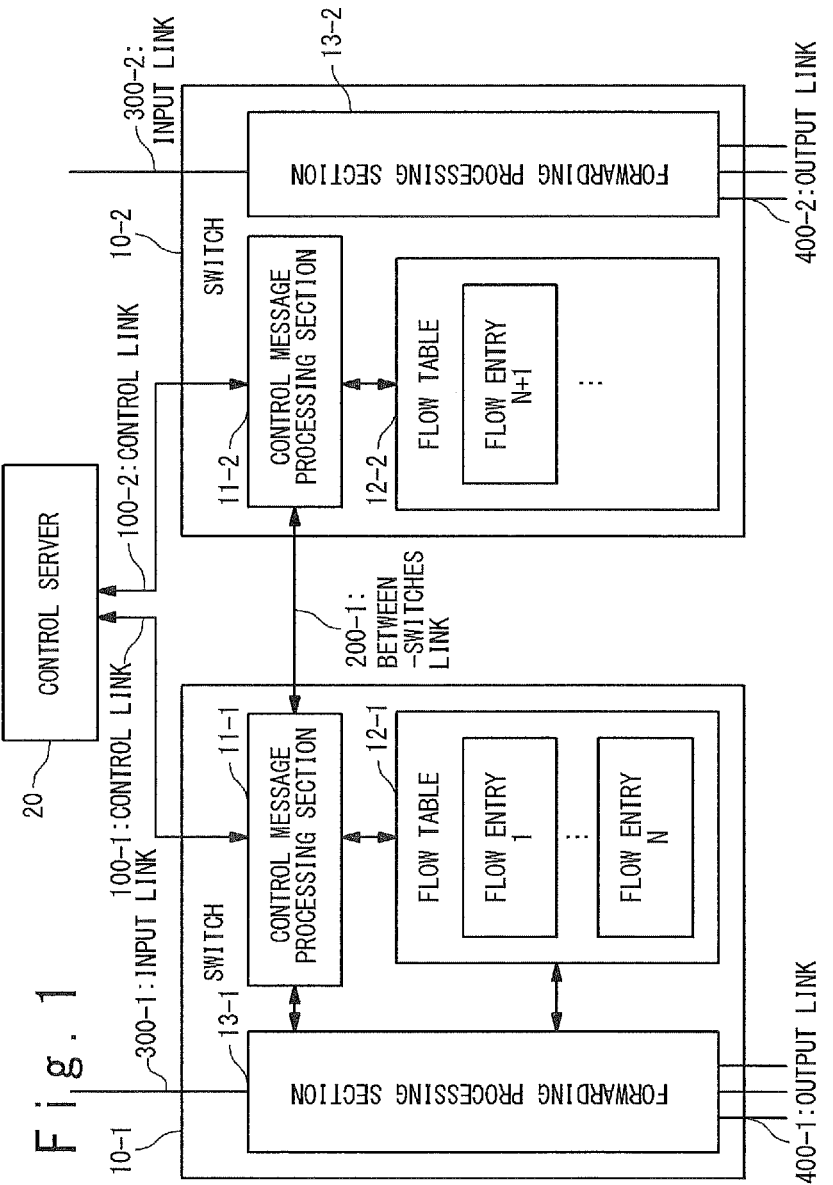

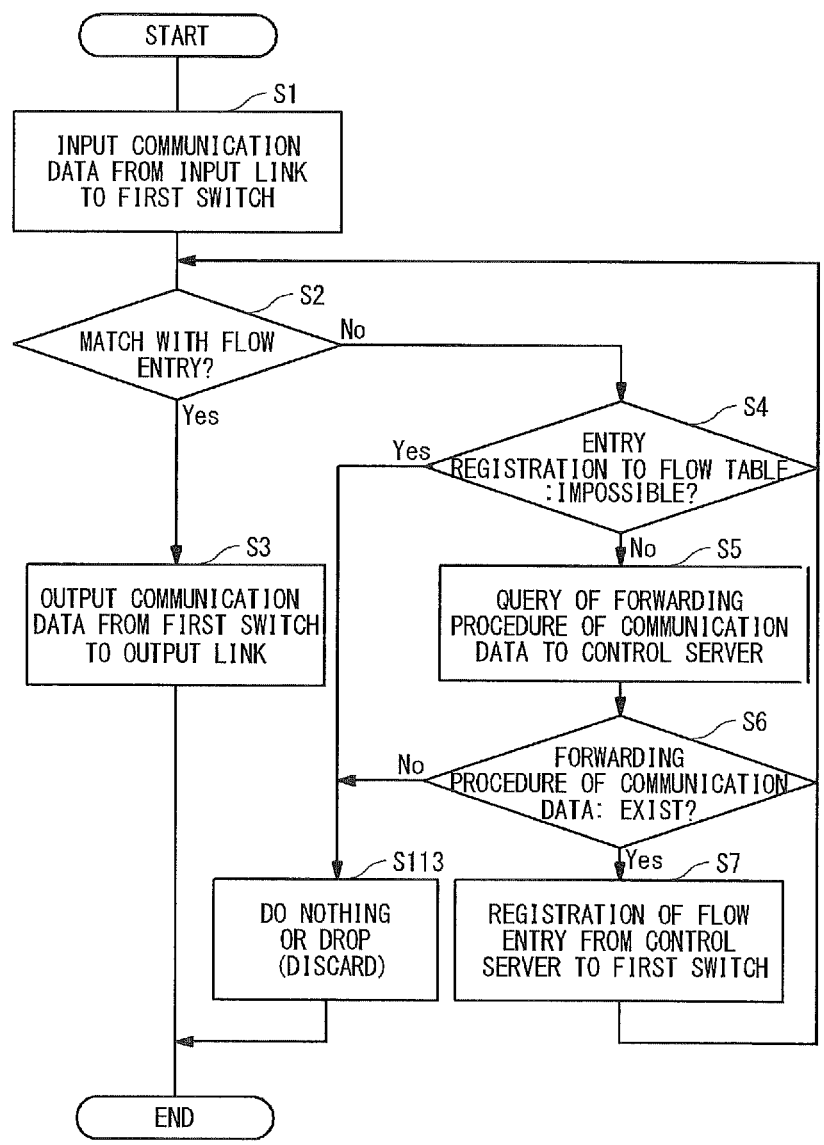

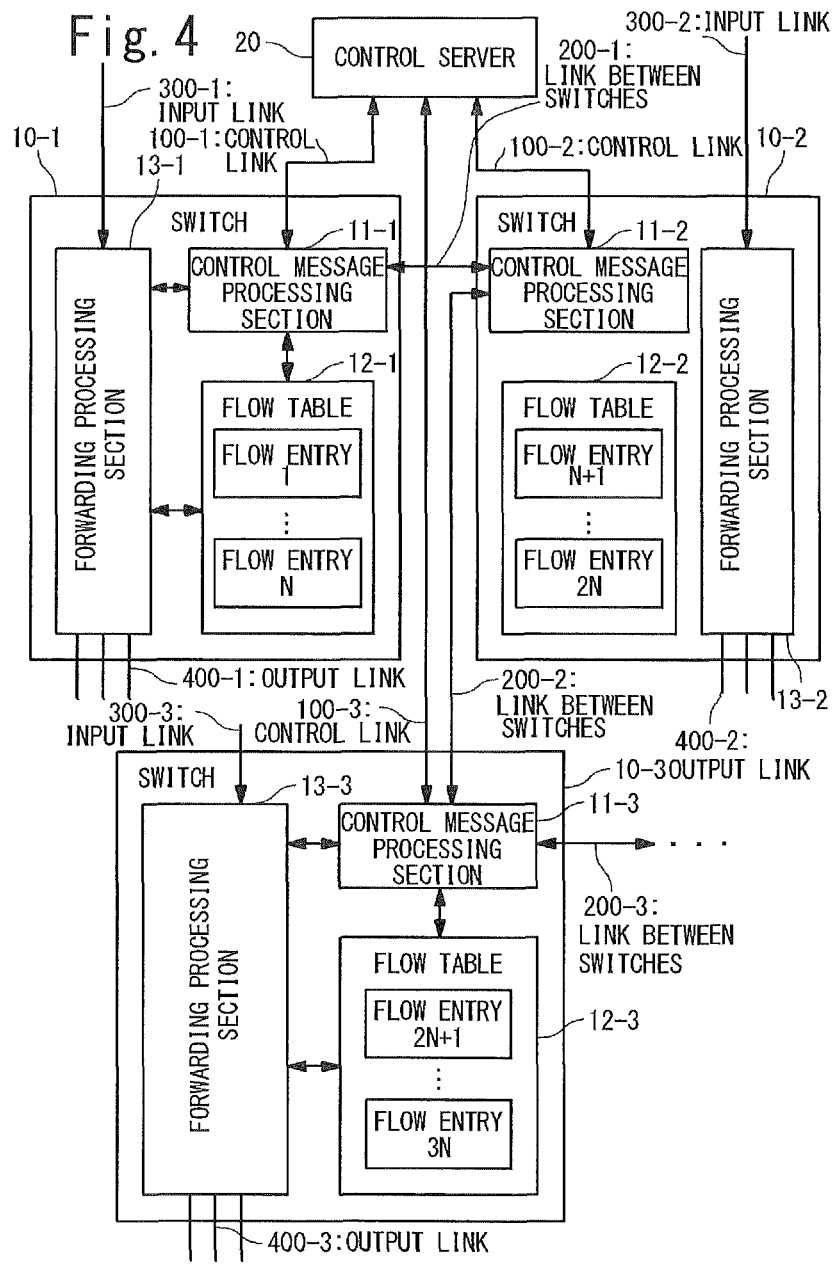

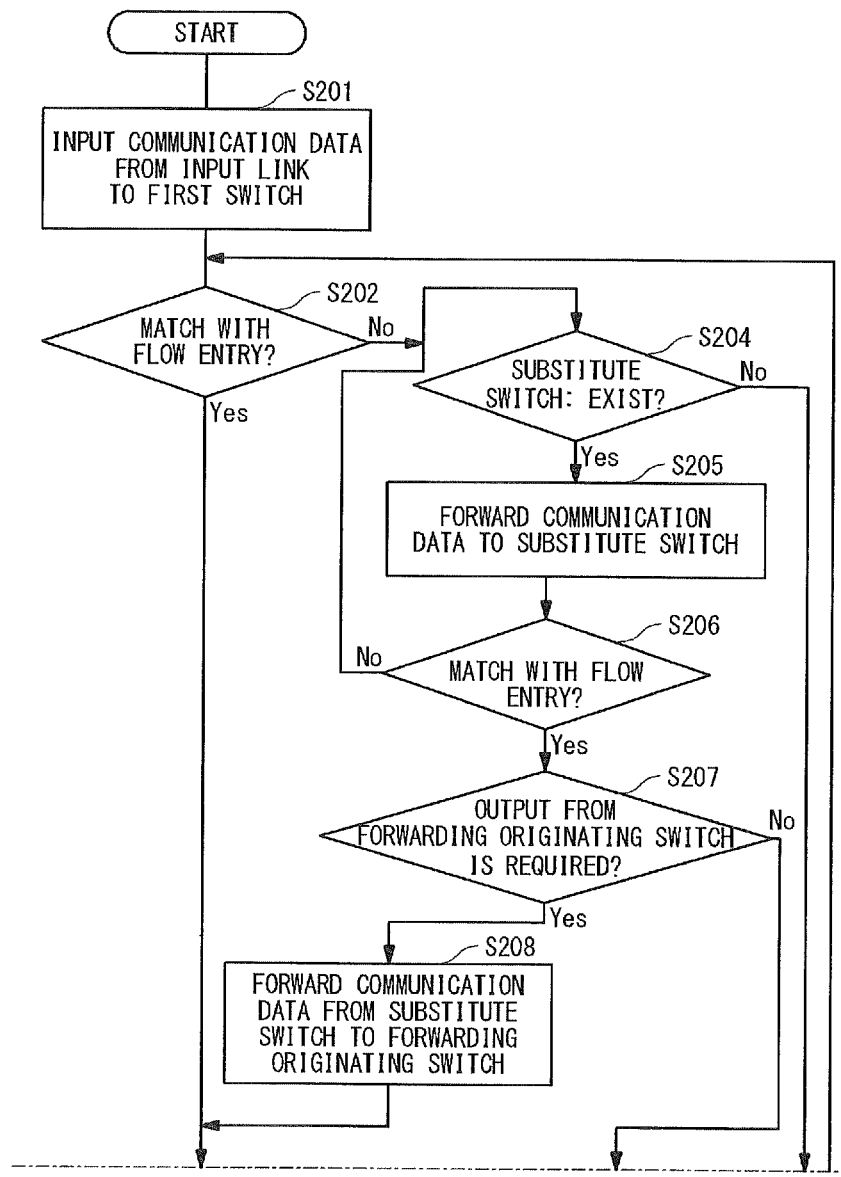

SWITCH SYSTEM, AND DATA FORWARDING METHOD

Note that, this application claims the priority based on Japanese patent application number JP2010-232597, and the content disclosed in Japanese patent application number 2010-232597 is included in this application by this reference.

TECHNICAL FIELD

The present invention relates to a switch system. Specifically, the present invention relates to a switch system which uses the OpenFlow technique.

BACKGROUND ART

As one of the route control procedures of a network communication, a route control procedure which uses the OpenFlow technique being a control protocol of communication devices has been studied. The non-patent literatures 1 and 2 describe the OpenFlow technique in detail. A network whose route control is performed by the OpenFlow network is called as the OpenFlow network.

In the OpenFlow network, the behavior of a switch is controlled by a controller like the OFC (OpenFlow Controller) operating the Flow Table of a switch like the OFS (OpenFlow Switch). A link between the controller and the switch is connected by the Secure Channel for controlling the switch by the controller using a control message complying with the OpenFlow protocol.

The switch of the OpenFlow network indicates an edge switch and a core switch which form an OpenFlow network and subjected to the control of a controller. In the OpenFlow network, the sequence of flows of a packet from the reception of the packet (a communication data) at an input side edge switch to the sending of the packet at the output side edge switch is called as the Flow.

The Flow Table is a table in which a Flow entry, which defines a predetermined processing (action) to be performed to a packet group (packet series) being matched with a predetermined match condition (rule), is registered.

The rule of the Flow entry is defined by various combinations of any or all of the Destination Address, the Source Address, the Destination Port, the Source port, which are included in the header region of each protocol level of the packet, and can be distinguished to each other. In addition, the information of the Ingress Port can also be used as a rule of the Flow entry.

The action of the flow entry indicates an operation such as "outputting to a specific port", "discard", "rewriting of the header" and the like. For example, if identification information (output port number and the like) is indicated in the action of the flow entry, the switch outputs the packet to the corresponding port. If the identification information of the output port is not indicated, the packet is discarded. Or, if header information is indicated in the action of the flow entry, the switch rewrites the header of the packet based on the indicated header information.

Each switch of the OpenFlow network performs the action of the flow entry to the packet group being matched with the rule of the flow entry registered in the flow table.

However, there is a limit in the amount of the memory for the flow table mounted on a switch, so that the number of flow entries which can be registered in a switch has an upper limit. Therefore, there is a problem that, when the number of the registered flow entries reaches the upper limit, it becomes impossible to register a new flow entry, and a communication data is not forwarded by the procedure based on the control from the control server.

There is also a problem that, when the type of the flow entry is defined in detail, the number of the flow entries to be registered increases, so that the amount of the memory for the flow table may become insufficient. As a result, in addition to the upper limit of the number of the flow entry, there has been a problem that the types of the Flow available to the system design have an upper limit.

CITATION LIST

Non-Patent Literature

[NPTL 1] "The OpenFlow Switch Consortium" <http://www.openflowswitch.org/>
[NPTL 2] "OpenFlow Switch Specification Version 1.0.0 (Wire Protocol 0x01) Dec. 31, 2009"<http://www.openflow.org/documents/openflow-spec-v1.0.0.pdf>

SUMMARY OF INVENTION

An object of the present invention is to provide a switch system which can operate as follows: when a control server registers a flow entry in a flow table of a switch, in a case where an error message which indicates that no capacity is remained in the flow table is returned from the switch, the control server registers the flow entry to another switch belonging to the same switch group.

Another object of the present invention is to provide a switch system which can operate as follows: when forwarding a communication data by a switch, in a case where a forwarding procedure is not determined after retrieving all flow entries in the flow table, the communication data is forwarded to another switch in the same switch group, and the retrieval of the flow entries in the flow table of the another switch is continued.

According to the present invention, a switch system includes: a first switch; a second switch; and a control server. The first switch forwards a communication data, if the communication data is matched with any of at least one flow entry registered in a flow table in the first switch, based on a forwarding procedure defined by the matched flow entry, when the communication data is inputted from an input link. Further, the first switch forwards the communication data to a switch connected via a between-switches link (here, this is a second switch), if the communication data is not matched with any of the at least one flow entry registered in the flow table in the first switch. The second switch belongs to a switch group same with the first switch, and forwards the communication data, if the communication data is matched with any of at least one flow entry registered in a flow table in the second switch, based on a forwarding procedure defined by the matched flow entry, when the second switch received the communication data from the first switch via the between-switches link. The control server registers a flow entry in the flow table in the first switch and, when the flow table in the first switch becomes impossible to register a flow entry, register the flow entry which was to be registered in the first switch in the flow table in the second switch.

According to the present invention, a switch forms a switch group, and includes: a flow table; a forwarding processing section; and a control message processing section. In the flow table, at least one flow entry defining a forwarding procedure of a communication data which is matched with a predetermined match condition is registered. The forwarding processing section performs checking whether a communication data is matched with any of the at least one flow entry registered in the flow table when the communication data is received, and forwards the communication data, when the communication data is matched with any of the at least one flow entry, based on a forwarding procedure defined in the matched flow entry, and forwards the communication data to an unretrieved switch which is a switch belonging to the switch group and having a flow table to which the checking is not performed. The control message processing section performs a query of a forwarding procedure of the communication data to a control server when the unretrieved switch does not exist in the switch group, and to register a flow entry which defines a forwarding procedure of the communication data in the flow table based on a control by the control server.

According to a data forwarding method of the present invention, a control server registers at least one flow entry in a flow table of the first switch. Further, the control server registers a flow entry which was to be registered in the flow table of the first switch in a flow table of a second switch which belongs to a switch group same with the first switch, when the registering the flow entry in the flow table of the first switch becomes impossible. The first switch forwards the communication data, if the communication data is matched with any of the at least one flow entry in the flow table of the first switch, based on a forwarding procedure defined in the matched flow entry when the communication data is inputted from an input link. The first switch forwards the communication data to the second switch via a between-switches link when the communication data is not matched with any of the at least one flow entry registered in the flow table of the first switch. The second switch forwards the communication data, if the communication data is matched with any of the at least one flow entry registered in the flow table of the second switch, based on a forwarding procedure defined in the matched flow entry when the communication data is received from the first switch via the between-switches link.

According to the present invention, a program is performed by a switch which forms a switch group, and the program makes the switch executes the followings: a step of registering at least one flow entry defining a forwarding procedure of a communication data which is matched with a predetermined match condition in a flow table in the switch based on a control by a control server; a step of performing checking whether a communication data is matched with any of the at least one flow entry registered in the flow table when the communication data is received; forwarding the communication data when the communication data is matched with any of the at least one flow entry, based on a forwarding procedure defined in the matched flow entry; forwarding the communication data to an unretrieved switch which is a switch belonging to the switch group and having a flow table to which the checking is not performed; and performing a query of a forwarding procedure of the communication data to a control server when the unretrieved switch does not exist in the switch group. The program of the present invention can be stored in a storage device or a storage medium.

According to the above, it becomes possible for one communication data to perform retrieval of flow entries in a plurality of switches, so that it becomes possible to increase the upper limit of the number of flow entries subjected to the retrieval.

BRIEF DESCRIPTION OF DRAWINGS

FIG. 1 shows an example of a structure of a switch system according to a first exemplary embodiment of the present invention;

FIG. 2 is a flowchart showing an operation of a switch system according to a known OpenFlow technique;

FIG. 4 shows an example of a structure of a switch system according to a second exemplary embodiment of the present invention;

FIG. 5A is a flowchart showing an operation of a switch system according to a second exemplary embodiment of the present invention.

DESCRIPTION OF EXEMPLARY EMBODIMENTS

First Exemplary Embodiment

Figure 3A:
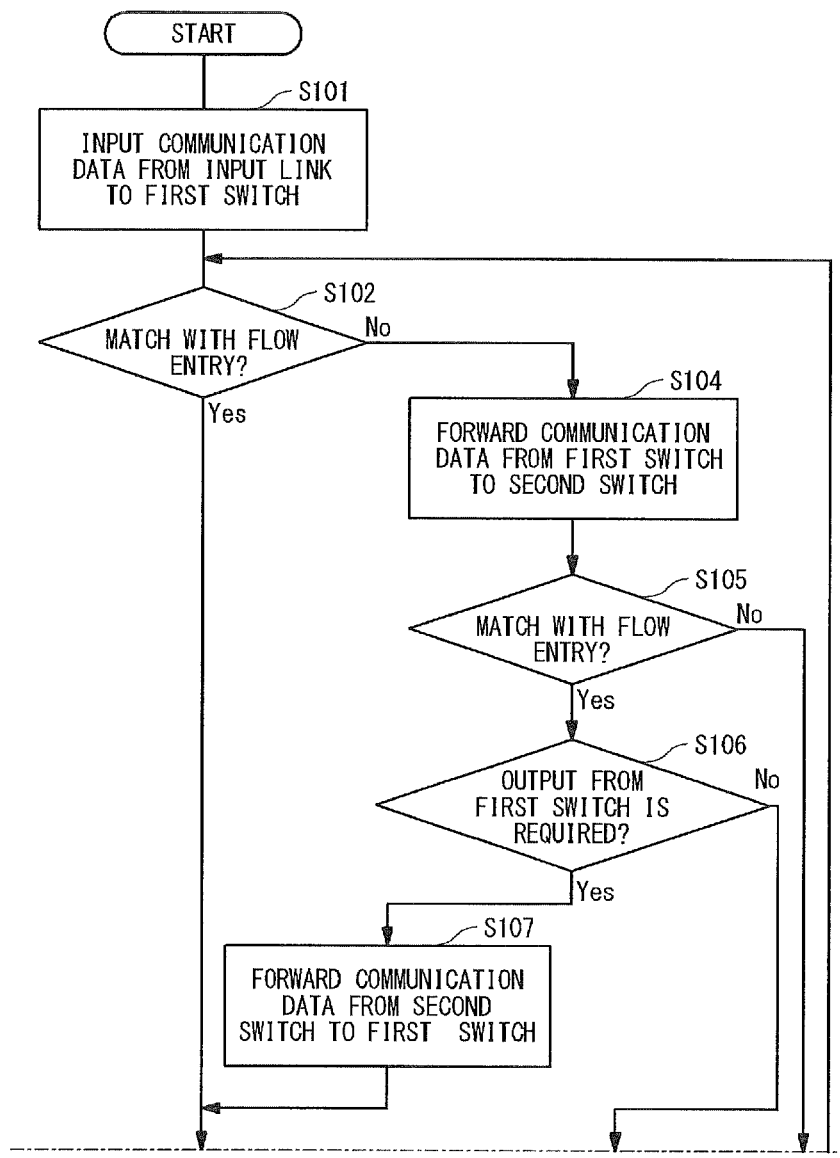
FIG. 3A is a flowchart showing an operation of a switch system according to a first exemplary embodiment of the present invention.

A first exemplary embodiment of the present invention is explained below with reference to the accompanying drawings.

[Structure of Switch System]

As shown in FIG. 1, a switch system according to a first exemplary embodiment of the present invention includes switches 10 (10–i, i=1 to n: n is the number of switches) and a control server 20.

Each of the switches 10 (10–i, i=1 to n) forwards a communication data based on information of a flow entry in a flow table which is held in the own switch.

Each switch 10 (10–i, i=1 to n) is subjected to a route control by the same (common) control server 20 in accordance with the OpenFlow technique and forms a switch group.

Here, it is assumed that each switch 10 (10–i, i=1 to n) is subjected to a route control by the same (common) control server 20 and forms one switch group. However, actually, the switch group may be divided into smaller groups by setting a predetermined condition.

FIG. 1 shows a switch 10-1 and a switch 10-2 as a minimum configuration of a switch system according to the first exemplary embodiment of the present invention, and these two devices form a switch group.

Further, each switch 10 (10=i, i=1 to n) is connected to a control link 100 (100–i, i=1 to n), a between-switches link 200 (200–i, i=1 to m: m is an arbitrary number), an input link 300 (300–i, i=1 to n), and an output link 400 (400–i, i=1 to n). Namely, each switch 10 (10=i, i=1 to n) has terminals (ports) for connecting to each link.

The control link 100 is a communication line which connects the switch 10 and the control server 20.

The between-switches link 200 is a communication line which connects switches belonging to a same switch group to each other.

The input link 300 is a communication line for inputting a communication data to the switch 10.

The output link 400 is a communication line for outputting a communication data from the switch 10.

The control link 100, the input link 300, and the output link 400 are provided to every switch 10. The number of the between-switches links 200 is same with the number of switches which are directly connected to the other switch 10 via between-switch links.

The control server 20 sends a registration request of a flow entry which defines a match condition (rule) and a predetermined processing (action) for a communication data to each switch 10 (10−i, i=1 to n). The contents of the registration of a flow entry are assumed to include a new registration, a change, and a deletion. In the OpenFlow technique, the control server 20 is also called as the controller.

Each switch 10 (10−i, i=1 to n) includes a control message processing section 11 (11−i, i=1 to n), a flow table 12 (12−i, i=1 to n), and a forwarding processing section (13−i, i=1 to n).

Here, the switch 10-1 includes a control message processing section 11-1 and a flow table 12-1. Also, the switch 10-2 includes a control message processing section 11-2 and a flow table 12-2.

The control message processing section 11 registers a flow entry when a registration request of the flow entry is received from the control server 20.

The control server 20 and the control message processing section 11 are connected to each other via the control link 100.

Here, the control server 20 and the control message processing section 11-1 in the switch 10-1 are connected to each other via the control link 100-1. Also, the control server 20 and the control message processing section 11-2 in the switch 10-2 are connected to each other via the control link 100-2.

Each switch 10 (10−i, i=1 to n) are connected to each other by a between-switches link 200.

Here, the switch 10-1 and the switch 10-2 are connected by the between-switches link 200-1. For example, the forwarding processing section 13-1 and the forwarding processing section 13-2 are connected by the between-switches link 200-1.

The flow table 12 is a table in which at least one flow entry, which defines a predetermined processing (action) to be performed to the communication data being matched with a predetermined match condition (rule), is registered. Here, it is assumed that "a forwarding procedure of a communication data" is defined in a flow entry as the predetermined processing (action). As an example of the forwarding procedure, the indication of an output link connected to the forwarding destination (a node of the next stage) and the like are considered.

The memory amount for the respective flow table 12 is assumed to be enough for registering the N number of flow entries at maximum. Note that, actually, it is enough for the memory amount for each flow table to be able to register at least N number of flow entries.

The forwarding processing section 13 inputs a communication data from the input link 300, retrieves the flow table 12 for the communication data, and when the communication data is matched with (Hit) the match condition of any of the at least one flow entries, outputs the communication data from the output link 400 based on the forwarding procedure defined in the matched flow entry.

Here, the forwarding processing section 13-1 in the switch 10-1 inputs a communication data from the input link 300-1, retrieves the flow table 12-1 for the communication data, and when the communication data is matched with (Hit) the match condition of any of the at least one flow entries, outputs the communication data from the output link 400-1 based on the forwarding procedure defined in the matched flow entry.

[Exemplification of Hardware]

As an example of the switch 10 (10−i, i=1 to n), the OpenFlow Switch is assumed. As an example of the OpenFlow Switch, a network switch, a multi-layer switch and the like can be considered. The multi-layer switch can be further classified in more detail for every layer of supporting OSI reference model. As main types, there are the layer 3 switch which reads data of the network layer (3rd layer), the layer 4 switch which reads data of the transport layer (4th layer), the layer 4 switch (application switch) which reads data of the application layer (7th layer). Further, in the OpenFlow network, usual relay devices such as a router, a switching hub and the like can also be used as the OpenFlow Switch. Moreover, the switch 10 (10−i, i=1 to n) may be a virtual switch constructed on a physical machine. Moreover, as alternative example of the switch 10 (10−i, i=1 to n), a router, a proxy, a gateway, a firewall, a load balancer, a packet shaper, a SCADA (Supervisory Control And Data Acquisition), a gatekeeper, a base station, an AP (Access Point), a CS (Communication Satellite), and a computer having a plurality of communication ports and the like can be considered.

As examples of the control server 20, a PC (personal computer), an appliance, a workstation, a main frame, a supercomputer and the like is assumed. Further, the control server may be a VM (virtual machine) constructed on a physical machine.

As an example of the network connecting each of the switches 10 (10−i, i=1 to n) and the control server 20, the LAN (Local Area Network) is assumed. As other examples, the Internet, the Wireless LAN, the Wide Area Network, the Backbone, a cable television (CATV) line, a land-line phone network, a mobile phone network, the WiMAX (IEEE 802.16a), the 3G (3rd Generation), a lease line, an IrDA (Infrared Data Association), the Bluetooth (registered trademark), a serial communication line, a data bus can also be considered.

Though not shown in the drawings, each of the switches 10 (10−i, i=1 to n) and the control server are realized by: a processor which is driven and executes predetermined processing based on a program; a memory which stores the program and various data; and a communication I/F (interface).

As examples of the above processor, a CPU (Central Processing Unit), a microprocessor, a microcontroller, an Integrated Circuit (IC) having dedicated functions, and the like can be considered.

As examples of the above memory, a semiconductor storage device such as a RAM (Random Access Memory), a ROM (Read Only Memory), an EEPROM (Electrically Erasable and Programmable Read Only Memory), a flash memory and the like, an auxiliary storage device such as an HDD (Hard Disk Drive) an SSD (Solid State Drive) and the like, a removable disk such as a DVD (Digital Versatile Disk), and storage media such as an SD (Secure Digital) memory card and the like can be considered. Or, a storage device which uses the DAS (Direct Attached Storage), an FC-SAN (Fibre Channel-Storage Area Network), an NAS (Network Attached Storage), an IP-SAN (IP-Storage Area Network) and the like may be adopted.

As an example of the above communication interface, a semiconductor integrated circuit such as a board (mother board, I/O board), chip and the like, a network adopter such as an NIC (Network Interface Card) and the like or a similar extension card, a communication device such as an antenna, and a communication port such as a connector can be considered.

However, actually, the present invention is not limited to the above examples.

[An Operation of Switch System in a Conventional OpenFlow Technique]

In a switch system in a conventional OpenFlow Technique, in many cases, the switch 10-1 and the switch 10-2 are not connected by the between-switches link 200-1, and are not linked to each other. Namely, the switch 10-1 and the switch 10-2 operate completely independently.

The control server 20 registers flow entries sequentially in the switch 10-1 via the control link 100-1 and the control message processing section 11-1.

When the number of registered entries reaches N, the message processing section 11-1 in the switch 10-1 transmits a message of "entry impossible", which indicates that no more entry registration is possible, to the control server 20 via the control link 100-1.

The control server 20 becomes not possible to register the N+1-th and the after flow entries N+1 to the switch 10-1 when the message of "entry impossible" is received from the switch 10-1.

The forwarding processing section 13-1 in the switch 10-1 retrieves the flow entries in the flow table 12-1 from 1st flow entry 1 to N-th flow entry N for the communication date inputted from the input link 300-1. If any of the entries is not matched, the switch 10-1 becomes impossible to forward the inputted communication data.

[Detailed Operation of Switch System in Conventional Open-Flow Technique]

With reference to FIG. 2, a detailed operation of a switch system in a conventional OpenFlow technique is explained.

(1) Step S1

The forwarding processing section 13-1 in the switch 10-1 acquires a communication data inputted from the input link 300-1.

(2) Step S2

The forwarding processing section 13-1 retrieves the flow entries in the flow table 12-1 from 1st flow entry 1 to N-th flow entry N for the communication data, and checks that it is matched with any of the flow entries or not. For example, the forwarding processing section 13-1 determines that the communication data is matched with a flow entry when it is matched with (Hit) the match condition of any of the flow entries.

(3) Step S3

The forwarding processing section 13-1, when the communication data is matched with any of the flow entries in the flow table 12-1, outputs the communication data from the output link 400-1 based on the forwarding procedure defined in the matched flow entry.

(4) Step S4

On the contrary, when the communication data is not matched with any of the flow entries in the flow table 12-1, the forwarding processing section 13-1 checks whether the flow entry registration in the flow table 12-1 is impossible or not. For example, the forwarding processing section 13-1 checks the amount of the memory for the flow table 12-1, and if there is no space (available capacity) in the memory amount, determines that the flow entry registration is impossible.

(5) Step S5

When the flow entry registration in the flow table 12-1 is not impossible, the forwarding processing section 13-1 performs a query of the forwarding procedure for the communication data to the control server. It is because the possibility that the communication data is the firstly received type of packet and so that the flow entry is an unregistered "first packet" is high, when the communication data is not matched with any of the flow entries in the flow table 12-1.

(6) Step S6

The control server 20 checks whether there is a forwarding procedure corresponding to the communication data in response to the query from the switch 10-1.

(7) Step S7

When there is a forwarding procedure corresponding to the communication data, the control server 20 sends a registration request of the flow entry which defines the match condition and the forwarding procedure of the communication data. The control message processing section 11-1 in the switch 10-1, when the registration request of the flow entry is received from the control server 20, registers the flow entry in the flow table 12-1. Based on it, the forwarding processing section 13-1 outputs the communication data from the output link 400-1 based on the forwarding procedure defined in the registered flow entry.

(8) Step S8

The forwarding processing section 13-1 does nothing on, or discards the communication data, when the flow entry registration in the flow table 12-1 is impossible, or when there is not a forwarding procedure corresponding to the communication data as a result of the query to the control server 20. Namely, the forwarding processing section 13-1 cannot forward the communication data.

[Operation of Switch System in a First Exemplary Embodiment of the Present Invention]

In the switch system according to the first exemplary embodiment of the present invention, the switch 10-1 and the switch 10-2 are connected by the between-switches link 200-1 and linked to each other.

The control server 20 registers the flow entries to the switch 10-1 sequentially via the control link 100-1 and the control message processing section 11-1.

When the number of registered entries reaches N, the control message processing section 11-1 in the switch 10-1 transmits the message of "entry impossible" which indicates that no more entry registration is impossible to the control server 20 via the control link 100-1.

When the message of "entry impossible" is received from the switch 10-1, the control server 20 registers the flow entry N+1 after N+1-th sequentially in a switch 10-2 which belongs to the switch group with the switch 10-1 via the control link 100-2.

After that, the forwarding processing section 13-1 in the switch 10-1 retrieves the flow entries in the flow table 30 from the 1st flow entry 1 to the N-th flow entry N for the communication data inputted from the input link 300-1, and when it is not matched with any of them, forwards the communication data to the switch 10-2 via the between-switches link 200-1.

At this time, the forwarding processing section 13-1 may perform a query of the communication data to the control server 20, and in response to the instruction from the control server, and forward the communication data to the switch 10-2 via the between-switches link 200-1.

Or, in the forwarding processing section 13-1, a between-switches forwarding entry may be registered in the flow table 12-1 in advance. In the between-switches forwarding entry, "the forwarding procedure which indicates that a communication data is forwarded to the switch 10-2 via the between-switches link 200-1 when the communication data is not matched with any of them" is defined. Further, the between-switches forwarding entry may be automatically registered in the flow table 12-1 via the control link 100-1 and the control message processing section 11-1 at the timing of the starting-up of the switch 10-1 and the like.

The switch 10-2 continues the retrieval from the flow entry N+1 registered in the flow table 12-2 for the communication data, and when it is matched with (Hit) the match condition of any of the flow entries, forwards the communication data based on the content of the predetermined processing (action) defined in the matched flow entry.

[Detailed Operation of Switch System in the Present Exemplary Embodiment]

Figure 3B:
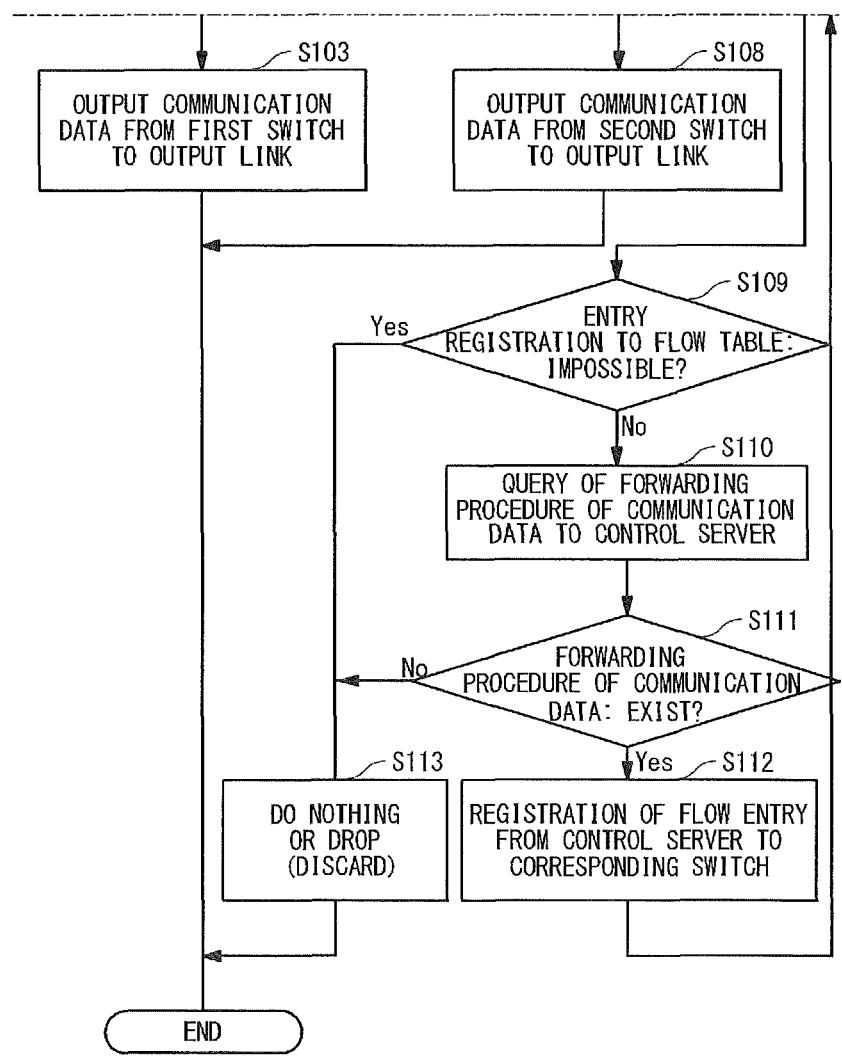
FIG. 3B is a flowchart showing an operation of a switch system according to a first exemplary embodiment of the present invention.

With reference to FIGS. 3A and 3B, the operation of the switch system according to the first exemplary embodiment of the present invention is explained in detail.

(1) Step S101

The forwarding processing section 13-1 in the switch 10-1 acquires a communication data inputted from the input link 300-1.

(2) Step S102

The forwarding processing section 13-1 retrieves the flow entries in the flow table 12-1 from the first flow entry 1 to the N-th flow entry N for the communication data, and checks whether the communication data is matched with any of the flow entries or not. For example, when the communication data is matched with (Hit) the match condition of any of the flow entries, the forwarding processing section 13-1 determines that the communication data is matched with the flow entry.

(3) Step S103

When the communication data is matched with any of the flow entries in the flow table 12-1, the forwarding processing section 13-1 outputs the communication data from the output link 400-1 based on the forwarding procedure defined in the matched flow entry.

(4) Step S104

On the contrary, when the communication data is not matched with any of the flow entries in the flow table 12-1, the forwarding processing section 13-1 forwards the communication data to the switch 10-2 via the between-switches link 200-1. Namely, the forwarding processing section 13-1 forwards the communication data to the switch 10-2 in the same switch group instead of the control server 20, or at a higher priority than the control server 20. Note that, actually, the forwarding processing section 13-1 may perform a query of the flow entry being matched with the communication data to the switch 10-2 with holding the communication data in itself.

(5) Step S105

The forwarding processing section 13-2 in the switch 10-2 retrieves the flow entries in the flow table 12-2 from N+1-th flow entry N+1 to 2N-th flow entry 2N for the communication data forwarded from the switch 10-1 and checks the whether the communication data is matched with any of them. For example, when the communication data is matched with (Hit) the match condition of any of the flow entries, the forwarding processing section 13-2 determines that it is matched with the flow entry.

(6) Step S106

When the communication data is matched with any of the flow entries in the flow table 12-2, the forwarding processing section 13-2 checks whether the communication data is required to be outputted from the forwarding originating switch 10-1 or not, with reference to the forwarding procedure defined in the matched flow entry. Namely, the forwarding processing section 13-2 checks whether the output from the forwarding originating switch 10-1 is defined or not in the forwarding procedure defined in the flow entry. For example, the following cases can be considered: the communication data is forwarded to a node under the control of the switch 10-1; or it is required for the sending originating address to be set to the address of the switch 10-1; and the like.

(7) Step S107

When the communication data is required to be outputted from the forwarding originating switch 10-1, the forwarding processing section 13-2 forwards the communication data to the forwarding originating switch 10-1 via the between-switches link 200-1 based on the forwarding procedure defined in the flow entry. The forwarding processing section 13-1 in the switch 10-1 outputs the forwarded communication data from the output link 400-1. Note that, the forwarding processing section 13-1 may operate, with holding the communication data in itself, as follows: the forwarding processing section 13-1 receives a response about the flow entry being matched with the communication data from the switch 10-2, and outputs the communication data from the output link 400-1 based on the forwarding procedure defined in the matched flow entry.

(8) Step S108

On the contrary, when the communication data is not required to be outputted from the forwarding originating switch 10-1, the forwarding processing section 13-2 outputs the communication data from the output link 400-2 based on the forwarding procedure defined in the matched flow entry.

(9) Step S109

Further, when the communication data is not matched with any of the flow entries in the flow table 12-2, the forwarding processing section 13-2 checks whether the flow entry registration in the flow table 12-2 is impossible or not. For example, the forwarding processing section 13-2 checks the amount of the memory for the flow table 12-2, and if there is no space (available capacity) in the memory amount, determines that the flow entry registration is impossible. Or, the forwarding processing section 13-2 may check whether the flow entry registration in the flow table 12-2 is impossible or not based on the existence or absence of the sending record (log) of the message of "entry impossible" to the control server 20. At this time, the forwarding processing section 13-2 may check whether the flow entry registration in the flow table 12-1 is impossible or not by performing a query of the availability of the flow entry registration in the flow table 12-1 also to the switch 10-1.

(10) Step S110

When the flow entry registration in the flow table is not impossible, the forwarding processing section 13-2 performs a query of the forwarding procedure applied to the communication data to the control server 20. It is because the possibility that the communication data is the firstly received type of packet and so that the flow entry is an unregistered "first packet" is high, when the communication data is not matched with any of the flow entries in the flow table 12-2.

(11) Step S111

The control server 20 checks whether there is a forwarding procedure corresponding to the communication data in response to the query from the switch 10-2.

(12) Step S112

When there is the forwarding procedure corresponding to the communication data, the control server 20 sends a registration request of the flow entry which defines the match condition and the forwarding procedure of the communication data to the corresponding switch 10 (here, either one of the switch 10-1 or the switch 10-2). Note that, naturally, when the message of "entry impossible" is received from the switch 10-1, the control server 20 sends the registration request of the flow entry which defines the match condition and the forwarding procedure of the communication data to the switch 10-2. When the registration request is received from the control server 20, the control message processing section 11 in the corresponding switch 10 registers the flow entry in the flow table 12. By this operation, the forwarding processing sect ion 13 in the corresponding switch 10 outputs the communication data from the output link 400 based on the forwarding procedure defined in the flow entry.

(13) Step S113

The forwarding processing section 13-2 does nothing on, or drops (discards) the communication data, when the flow entry registration in the flow table 12-2 is impossible, or when there is not a forwarding procedure corresponding to the communication data as a result of a query to the control server 20.

Effect of Present Exemplary Embodiment

The following effects can be achieved compared with switch systems of the conventional OpenFlow technique.

In this exemplary embodiment, for the excess over the memory amount for the flow table mounted in a switch, the memory for the flow table in the other switch is used. As a result, even in a case where the registration of the number of entries which cannot be stored in the flow table of one switch is required, the flow entries can be registered by using a plurality of switches.

Note that, the number of switches forming a switch group may not be two, and 3 or more switches may be combined for the registration of the flow table in the same manner.

Second Exemplary Embodiment

A second exemplary embodiment of the present invention is explained below.

In this exemplary embodiment, 3 or more switches are combined to form a switch group.

[Configuration of Switch System]

As represented in FIG. 4, the switch system according to the second exemplary embodiment of the present invention includes switches 10 (10–i, i=1 to n: n is the number of switches) and a control server 20.

The switch 10 (10–i, i=1 to n) and the control server 20 are the same to those of the first exemplary embodiment.

Each of the switches 10 (10–i, i=1 to n) forwards a communication data based on a flow entry in the flow table which is held in the own switch.

Each switch 10 (10–i, i=1 to n) is subjected to a route control by the same (common) control server 20 in accordance with the OpenFlow technique and forms a switch group.

Each switch 10 (10–i, i=1 to n) is connected to a control link 100 (100–i, i=1 to n), a between-switches link 200 (200–i, i=1 to m: m is n–1 or more), an input link 300 (300–i, i=1 to n), and an output link 400 (400–i, i=1 to n). Namely, each switch 10 (10–i, i=1 to n) has terminals (ports) for connecting to each link.

The control link is a communication line which connects the switch 10 and the control server 20.

The between-switches link 200 is a communication line which connects switches 10 belonging to a same switch group to each other.

The input link 300 is a communication line for inputting a communication data to the switch 10.

The output link 400 is a communication line for outputting a communication data from the switch 10.

The control link 100, the input link 300, and the output link 400 are provided to every switch 10. The number of the between-switches links 200 is same with the number of switches which are directly connected to the other switches 10 via between-switch links.

The control server 20 sends a registration request of a flow entry which defines a match condition (rule) and a predetermined processing (action) for a communication data to each switch 10 (10–i, i=1 to n). The contents of the registration of the flow entry are assumed to include a new registration, a change, and a deletion. In the OpenFlow technique, the control server 20 is also called as the controller.

Each switch 10 (10–i, i=1 to n) includes a control message processing section 11 (11–i, i=1 to n), a flow table 12 (12–i, i=1 to n), and a forwarding processing section (13–i, i=1 to n).

The control message processing section 11 registers a flow entry when a registration request of the flow entry is received from the control server 20.

The control server 20 and the control message processing section 11 are connected to each other via the control link 100.

The flow table 12 is a table in which at least one flow entry, which defines a predetermined processing (action) to be performed to the communication data being matched with a predetermined match condition (rule), is registered.

The forwarding processing section 13 inputs a communication data from the input link 300, retrieves the flow table 12 for the communication data, and when the communication data is matched with (Hit) the match condition of any of the at least one flow entries, outputs the communication data from the output link 400 based on the forwarding procedure defined in the matched flow entry.

Each switch 10 (10–i, i=1 to n) is connected to each other via the between-switches link 200. For example, the forwarding processing section 13 (13–i, i=1 to n) in each switch 10 (10–i, i=1 to n) is connected to the other forwarding processing sections 13 via the between-switches link 200.

Each switch 10 (10–i, i=1 to n) may be connected to a plurality of switches via the between-switch links 200. For example, the switch 10-1 may be connected to both of the switch 10-2 and the switch 10-3 via individual between-switches links 200.

Here, the switch 10-1 is a first switch which inputs a communication data actually. The switches 10-2 and after have a same function with the switch 10-1. For convenience, the switches 10-2 and after are called as a substitute switches.

[Detailed Operation of Switch System in Present Exemplary Embodiment]

Figure 5B:
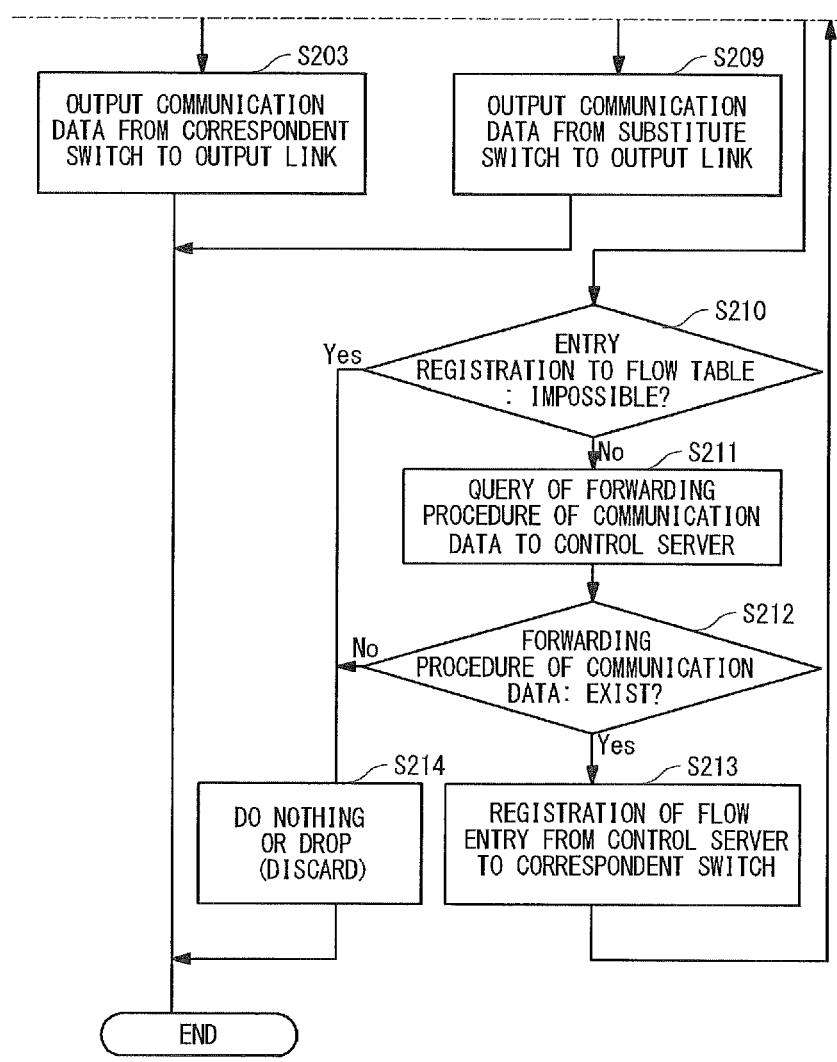
FIG. 5B is a flowchart showing an operation of a switch system according to a second exemplary embodiment of the present invention.

With reference to FIGS. 5A and 5B, the operation of the switch system according to the second exemplary embodiment of the present invention is explained in detail.

(1) Step S201

The forwarding processing section 13-1 in the switch 10-1 acquires a communication data inputted from the input link 300-1.

(2) Step S202

The forwarding processing section 13-1 retrieves the flow entries in the flow table 12-1 from the first flow entry 1 to the N-th flow entry N for the communication data, and checks whether the communication data is matched with any of the flow entries or not. For example, when the communication data is matched with (Hit) the match condition of any of the flow entries, the forwarding processing section 13-1 determines that it is matched with the flow entry.

(3) Step S203

When the communication data is matched with any of the flow entries in the flow table 12-1, the forwarding processing section 13-1 outputs the communication data from the output link 400-1 based on the forwarding procedure defined in the matched flow entry.

(4) Step S204

On the contrary, when the communication data is not matched with any of the flow entries in the flow table, the forwarding processing section 13-1 checks whether a substitute switch 10-$x$ ($2 \leq x \leq n$) being connected via a between-switches link 200 exists or not.

(5) Step S205

When the switch 10-$x$ exists, the forwarding processing section 13-1 forwards the communication data to the switch 10-$x$ via the between-switches link 200. Namely, the forwarding processing section 13-1 forwards the communication data to the switch 10-2 in the same switch group instead of the control server 20, or at a higher priority than the control server 20. At this time, the forwarding processing section 13-1 may send identification information of the switch 10-1 with the communication data for reporting that the flow table 12-1 in the switch 10-1 is already retrieved. Note that, actually, the forwarding processing section 13-1 may perform a query of the flow entry being matched with the communication data to the switch 10-$x$ with holding the communication data in itself.

(6) Step S206

The forwarding processing section 13-$x$ in the switch 10-$x$ retrieves the flow entries in the flow table 12-$x$ from $(x-1)N+1$-th flow entry $(x-1)N+1$ to xN-th flow entry xN for the communication data forwarded from the switch 10-1, and checks whether the communication data is matched with any of the flow entries. For example, when the communication data is matched with (Hit) the match condition of any of the flow entries, the forwarding processing section 13-$x$ determines that the communication data is matched with the flow entry. On the contrary, when the communication data is not matched with any of the flow entries in the flow table 12-$x$, the forwarding processing section 13-$x$ checks whether a substitute switch 10-$(x+1)$ being connected by the between-switches link 200 exists or not. Namely, the forwarding processing section 13-$x$ repeats the similar processing until the communication data is matched with (Hit) the match condition of any of the flow entries, or no more new switch belonging to the same switch group exists (until the processing reaches the last switch).

(7) Step S207

When the communication data is matched with any of the flow entries in the flow table 12-$x$, the forwarding processing section 13-$x$ checks whether the communication data is required to be outputted from the forwarding originating switch 10-$y$ ($1 \leq y < x$) or not, with reference to the forwarding procedure defined in the matched flow entry. The forwarding originating switch 10-$y$ may be the switch 10-1. Namely, the forwarding processing section 13-$x$ checks whether the output from the forwarding originating switch 10-$y$ is defined or not in the forwarding procedure defined in the flow entry. For example, the following cases can be considered: the communication data is forwarded to anode under the control of the switch 10-$y$; or it is required for the sending originating address to be set to the address of the switch 10-$y$; and the like.

(8) Step S208

When the communication data is required to be outputted from the forwarding originating switch 10-$y$, the forwarding processing section 13-$x$ forwards the communication data to the forwarding originating switch 10-$y$ via the between-switches link 200 based on the forwarding procedure defined in the flow entry. The forwarding processing section 13-$y$ in the switch 10-$y$ outputs the communication data from the output link 400-$y$. Note that, actually, the forwarding processing section 13-$y$ may operate, withholding the communication data in itself, as follows: the forwarding processing section 13-$y$ receives a response about the flow entry being matched with the communication data from the switch 10-$x$, and outputs the communication data from the output link 400-$y$ based on the forwarding procedure defined in the matched flow entry.

(9) Step S209

On the contrary, when the communication data is not required to be outputted from the forwarding originating switch 10-$y$, the forwarding processing section 10-$x$ outputs the communication data from the output link 400-$x$ based on the forwarding procedure defined in the matched flow entry.

(10) Step S210

When the communication data is not matched with the match condition of any of the flow entries until reaching the last switch belonging to the same switch group, the forwarding processing section 13-$n$ in the switch 10-$n$ checks whether the flow entry registration in the flow table 12-$n$ is impossible or not. For example, the forwarding processing section 13-$n$ checks the amount of the memory for the flow table 12-$n$, and if there is no space (available capacity), determines that the flow entry registration is impossible. Or, the forwarding processing section 13-$n$ may check whether the flow entry registration in the flow table 12-$n$ is impossible or not based on the existence or absence of the sending record (log) of the message of "entry impossible" to the control server 20. At this time, the forwarding processing section 13-$n$ may check whether the flow entry registration in the flow table 12 is impossible or not by performing a query of the availability of the flow entry registration in the flow table 12 also to all of the switches 10 other than the switch 10-$n$.

(11) Step S211

When the flow entry registration in the flow table 12-$n$ is not impossible, the forwarding processing section 13-$n$ performs a query of the forwarding procedure applied to the communication data to the control server 20. It is because the possibility that the communication data is the firstly received type of packet and so that the flow entry is an unregistered "first packet" is high, when the communication data is not matched with any of the flow entries in the flow table 12-$n$.

(12) Step S212

The control server 20 checks whether there is a forwarding procedure corresponding to the communication data in response to the query from the switch 10-$n$.

(13) Step S213

When there is the forwarding procedure corresponding to the communication data, the control server 20 sends a registration request of the flow entry which defines the match condition and the forwarding procedure of the communication data to the corresponding switch 10 (here, either one of the switch 10-1 to switch 10-$n$). Note that, naturally, when the message of "entry impossible" is received from all switches 10 other than the switch 10-$n$ the control server sends the registration request of the flow entry which defines the match condition and the forwarding procedure of the communication data to the switch 10-$n$. When the registration request is received from the control server 20, the control message processing section 11 in the corresponding switch 10 registers the flow entry in the flow table 12. By this operation, the forwarding processing section 13 in the corresponding switch 10 outputs the communication data from the output link 400 based on the forwarding procedure defined in the flow entry.

(14) Step S214

The forwarding processing section 13-$n$ does nothing on, or drops (discards) the communication data, when the flow entry registration in the flow table 12-$n$ is impossible, or when there is not a forwarding procedure corresponding to the communication data as a result or a query to the control server 20.

<Features of Present Invention>

As explained above, the present invention relates to a forwarding device and a forwarding method of a communication data in a switch system.

In the present invention, when a flow entry is registered in the flow table in a switch from the control server, if an error message which indicates that there is no space in the flow table is returned from the switch, the control server registers the flow entry in another switch in the same switch group.

Namely, a feature of the present invention is as follows. In the switch system formed by a control server and switches, when a flow entry which defines a forwarding procedure of a communication data in a flow table in a switch from the control server, if it is appeared that there is no available capacity for registering the flow entry in the flow table of the switch, the control server registers the flow entry in the flow table of another switch.

Further, in the present invention, a plurality of switches are combined to one switch group. When there is the number of flow entries which cannot be registered in a flow table of one switch, the flow entry is registered in the flow table in another switch of the switch group, and when the forwarding procedure of the communication data is not determined as a result of the retrieval of the flow entry in a certain switch, the communication data is forwarded to another switch of the switch group. Consequently, an operation in which the retrieval of the flow entry is continued becomes possible.

Namely, in the present invention, when a communication data is forwarded by a switch, if the forwarding procedure is not determined after the retrieval of all flow entries in the flow table of the switch, the communication data is forwarded to another switch in the switch group, and the retrieval of the flow entries is continued in the flow table of another switch.

As a result of the above operation, the flow entries can be retrieved in a plurality of switches for one communication data. Consequently, the upper limit of the number of flow entries retrieved for one communication data can be increased.

<Supplemental Note>

A part of or all or the above exemplary embodiments can be described as the supplemental notes below. However, actually, the present invention is not limited to the description below.

(Supplemental Note 1)

A switch system including:

a first switch which checks whether or not a communication data is matched with any of the flow entries registered in a flow table when the communication data is inputted from an input link, and when the communication data is matched with any of the flow entries, forwards the communication data based on based on a forwarding procedure defined by the matched flow entry, and when the communication data is not matched with any of the flow entries, forwards the communication data to a switch connected via a between-switches link;

a second switch belonging to a switch group same with the first switch and checks whether or not the communication data is matched with any of the flow entries in the flow table when the communication data is received from the first switch via the between-switches link, and when the communication data is matched with any of the flow entries, forwards the communication data based on the forwarding procedure defined in the matched flow entry; and a control server which registers a flow entry in the flow table in the first switch and, when the flow table in the first switch becomes impossible to register a flow entry, registers the flow entry which was to be registered in the first switch in the flow table in the second switch.

(Supplemental Note 2)

The switch system according to supplemental note 2, wherein the second switch performs a query of a forwarding procedure of the communication data to the control server when the communication data in not matched with any of at least one flow entry registered in the flow table in the second switch, and the control server registers a flow entry which defines a forwarding procedure of the communication data in the flow table in any of the switches belonging to the switch group in response to the query of a forwarding procedure.

(Supplemental Note 3)

The switch system according to supplemental note 1, further includes a third switch which belongs to the switch group same with the first switch and the second switch and forwards the communication data, if the communication data is received from the second switch via the between-switches link, when the communication data is matched with any of at least one flow entry registered in a flow table in the third switch, based on a forwarding procedure defined in the matched flow entry, wherein the second switch forwards the communication data to the third switch via the between-switches link when the communication data is not matched with any of the at least one flow entry registered in the flow table in the second switch, wherein the third switch performs a query of a forwarding procedure of the communication data to the control server when the communication data is not matched with any of the at least one flow entry registered in the flow table in the third switch, and wherein the control server registers a flow entry which defines a forwarding procedure of the communication data in the flow table of any of the switches belonging to the switch group in response to the query of a forwarding procedure of the communication data.

(Supplemental Note 4)

The switch system according to any of supplemental note 1 to 3, wherein a switch belonging to the switch system includes:

a flow table in which at least one flow entry defining a forwarding procedure of a communication data which is matched with a predetermined match condition is registered;

a forwarding processing section which performs checking whether a communication data is matched with any of the at least one flow entry registered in the flow table when the communication data is received from an input link, and forwards the communication data, when the communication data is matched with any of the at least one flow entry, based on a forwarding procedure defined in the matched flow entry, and forwards the communication data to an unretrieved switch which is a switch belonging to the switch group and having a flow table to which the checking is not performed, and a control message processing section which performs a query of a forwarding procedure of the communication data to a control server when the unretrieved switch does not exist in the switch group, and registers a flow entry which defines a forwarding procedure of the communication data in the flow table based on a control by the control server.

Further, in the above, each of the second switch and the third switch may be plural.

(Supplemental Note 5)

A switch system including: a plurality of switches which form a switch group, checks whether a communication data is matched with any of at least one entry registered in a flow table when the communication data is inputted from an input link, and if the communication data is matched with any of the at least one flow entry, forwards the communication data based on the forwarding procedure defined in the matched flow entry, and if the communication data is not matched with any of the at least one flow entry, if there is a substitute switch connected via a between-switches link, forwards the communication data to the substitute switch, and if there is not a substitute switch connected via a between-switches link, performs a query of the forwarding procedure of the communication data to the control server; and A control server which registers a flow entry in the flow table of any of the plurality of switches, and when it becomes impossible to register a flow entry in the flow table of the switch, registers the flow entry which was to be registered to the switch in the flow table of another switch forming the switch group.

In the above, some exemplary embodiments are explained in detail. However, in the present invention, various modifications can be applied to them in a scope not deviated from the essence of the present invention.

The invention claimed is:

1. A switch system comprising:
a first switch configured to include a flow table, input a communication data from an input link, check whether the communication data is matched with any of at least one flow entry registered in the flow table in the first switch, as a result of the check, and forward the communication data based on a forwarding procedure defined by the matched flow entry when the communication data is matched;
a second switch belonging to a switch group same with the first switch and configured to include a flow table; and
a control server configured to register a flow entry in the flow table in the first switch
wherein the first switch is configured to forward the communication data to a switch, which belongs to the switch group same with the second switch and is connected via the between-switches link, when the communication data is not matched with any of at least one flow entry registered in the flow table in the first switch,
wherein the second switch is configured to receive the communication data from the first switch via the between-switches link, check whether the communication data is matched with any of at least one flow entry registered in the flow table in the second switch, as a result of the check, and forward the communication data based on a forwarding procedure defined by the matched flow entry, when the communication data is matched, and
wherein the control server is configured to register the flow entry which was to be registered in the first switch in the flow table in the second switch, when the flow table in the first switch becomes impossible to register a flow entry.

2. The switch system according to claim 1, wherein the second switch is configured to perform a query of a forwarding procedure of the communication data to the control server when the communication data is not matched with any of at least one flow entry registered in the flow table in the second switch, and
the control server is configured to register a flow entry which defines a forwarding procedure of the communication data in the flow table in the first switch or in the flow table in the second switch in response to the query of a forwarding procedure.

3. The switch system according to claim 1, further comprising a third switch which belongs to the switch group same with the first switch and the second switch, the third switch is configured to include a flow table, the third switch is configured to forward the communication data when the communication data is received from the second switch via the between-switches link, and when the communication data is matched with any of at least one flow entry registered in a flow table in the third switch, based on a forwarding procedure defined in the matched flow entry,
wherein the second switch is configured to forward the communication data to the third switch via the between-switches link when the communication data is not matched with any of the at least one flow entry registered in the flow table in the second switch,
wherein the third switch is configured to perform a query of a forwarding procedure of the communication data to the control server when the communication data is not matched with any of the at least one flow entry registered in the flow table in the third switch, and
wherein the control server is configured to register a flow entry which defines a forwarding procedure of the communication data in the flow table of the first switch, the second switch, or the third switch in response to the query of a forwarding procedure of the communication data.

4. A switch, which forms a switch group, comprising:
a flow table in which at least one flow entry defining a forwarding procedure of a communication data which is matched with a predetermined match condition is registered;
a forwarding processing section configured to perform checking whether a communication data is matched with any flow entry of the at least one flow entry registered in the flow table when the communication data is received, and to forward the communication data, when the communication data is matched with any flow entry of the at least one flow entry, based on a forwarding procedure defined in the matched flow entry, and to forward the communication data to an unretrieved switch which is a switch belonging to the switch group and having a flow table to which the checking is not performed, and
a control message processing section configured to perform a query of a forwarding procedure of the communication data to a control server when the unretrieved switch does not exist in the switch group, and to register a flow entry which defines a forwarding procedure of the communication data in the flow table based on a control by the control server.

5. A data forwarding method comprising:
registering, by a control server, at least one flow entry in a flow table of the first switch;
registering, by the control server, a flow entry which was to be registered in the flow table of the first switch in a flow table of a second switch which belongs to a switch group same with the first switch, when the registering the flow entry in the flow table of the first switch becomes impossible;
forwarding, by the first switch, the communication data when the communication data is matched with any of the at least one flow entry in the flow table of the first switch, based on a forwarding procedure defined in the matched flow entry when the communication data is inputted from an input link;
forwarding, by the first switch, the communication data to the second switch via a between-switches link when the communication data is not matched with any of the at least one flow entry registered in the flow table of the first switch; and
forwarding, by the second switch, the communication data when the communication data is matched with any of the at least one flow entry registered in the flow table of the second switch, based on a forwarding procedure defined in the matched flow entry when the communication data is received from the first switch via the between-switches link.

6. The data forwarding method according to claim 5, wherein the first switch includes a flow table, inputs a communication data from an input link, and checks whether the communication data is matched with any of at least one flow entry registered in the flow table in the first switch, as a result of the check, and forward the communication data based on a forwarding procedure defined by the matched flow entry when the communication data is matched,
wherein the second switch belongs to a switch group same with the first switch and includes a flow table, and
wherein the first switch forwards the communication data to a switch, which belongs to the switch group same with the second switch and is connected via the between-switches link, when the communication data is not matched with any of at least one flow entry registered in the flow table in the first switch.

7. The data forwarding method according to claim 6, wherein the second switch is configured to receive the communication data from the first switch via the between-switches link, check whether the communication data is matched with any of at least one flow entry registered in the flow table in the second switch, as a result of the check, and forward the communication data based on a forwarding procedure defined by the matched flow entry, when the communication data is matched, and
wherein the control server is configured to register the flow entry which was to be registered in the first switch in the flow table in the second switch, when the flow table in the first switch becomes impossible to register a flow entry.

8. The data forwarding method according to claim 5, further comprising:
performing, by the second switch, a query of a forwarding procedure of the communication data to the control server if the communication data is not matched with any of the at least one flow entry registered in the flow table of the second switch; and
registering, by the control server, a flow entry which defines a forwarding procedure of the communication data in the flow table of the first switch or the flow table of the second switch in response to the query of the forwarding procedure of the communication data.

9. The data forwarding method according to claim 5, further comprising:

forwarding, by the second switch, the communication data to a third switch which belongs to the switch group same with the first switch and second switch via a between-switches link when the communication data is not matched with any of the at least one flow entry registered in the flow table of the second switch;
forwarding, by the third switch, the communication data when the communication data is matched with any of the at least one flow entry registered in a flow table of the third switch, based on the forwarding procedure defined in the matched flow entry when the communication data is received from the second switch via a between-switch link;
performing a query, by the third switch, of a forwarding procedure of the communication data to the control server when the communication data is not matched with any of the at least one flow entry registered in the flow table of the third switch; and
registering a flow entry, by the control server, which defines a forwarding procedure of the communication data in the flow table of the first switch, the second switch, or the third switch in response to the query of the forwarding procedure of the communication data.

10. A non-transient storage medium storing a program performed by a switch which forms a switch group, wherein the program makes the switch execute a method comprising:
registering at least one flow entry defining a forwarding procedure of a communication data which is matched with a predetermined match condition in a flow table in the switch based on a control by a control server;
performing checking whether a communication data is matched with any flow entry of the at least one flow entry registered in the flow table when the communication data is received;
forwarding the communication data when the communication data is matched with any flow entry of the at least one flow entry, based on a forwarding procedure defined in the matched flow entry;
forwarding the communication data to an unretrieved switch which is a switch belonging to the switch group and having a flow table to which the checking is not performed; and
performing a query of a forwarding procedure of the communication data to a control server when the unretrieved switch does not exist in the switch group.

* * * * *